United States Patent [19]

Tatemoto et al.

[11] Patent Number: 5,171,805
[45] Date of Patent: Dec. 15, 1992

[54] MODIFIED POLYTETRAFLUOROETHYLENE AND PROCESS FOR PREPARING THE SAME

[75] Inventors: Masayoshi Tatemoto; Yoshihisa Yamamoto; Katsutoshi Yamamoto; Hirofumi Onogi, all of Osaka, Japan

[73] Assignee: Daikin Industries Ltd., Osaka, Japan

[21] Appl. No.: 864,194

[22] Filed: Apr. 3, 1992

Related U.S. Application Data

[63] Continuation of Ser. No. 622,273, Dec. 6, 1990, abandoned, which is a continuation of Ser. No. 228,758, Aug. 5, 1988, abandoned.

[30] Foreign Application Priority Data

Aug. 5, 1987 [JP] Japan .................................. 62-195828

[51] Int. Cl.$^5$ .............................................. C08F 236/20
[52] U.S. Cl. ..................................... 526/252; 526/255
[58] Field of Search ................................ 526/252, 255

[56] References Cited

U.S. PATENT DOCUMENTS 2,468,664  4/1949  Hanford .............................. 526/252

Primary Examiner—Bernard Lipman
Attorney, Agent, or Firm—Birch, Stewart, Kolasch & Birch

[57] ABSTRACT

Modified polytetrafluoroethylene unsintered powder of which has sintering-densification indexes $P_{10}$, $P_{25}$ and $P_{50}$ of not larger than 0.2, which is suitable for producing a porous molding article.

7 Claims, 9 Drawing Sheets

MODIFIED POLYTETRAFLUOROETHYLENE AND PROCESS FOR PREPARING THE SAME

This application is a continuation of application Ser. No. 07/622,273 filed on Dec. 6, 1990, now abandoned, which is a continuation of application Ser. No. 07/228,758 filed Aug. 5, 1988, now abandoned.

BACKGROUND OF THE INVENTION

1. Field of the Invention

The present invention relates to modified polytetrafluoroethylene (hereinafter referred to as "PTFE") and a process for preparing the same. More particularly, the present invention relates to modified PTFE which is suitable for producing a porous article by low pressure compression molding and has good mechanical properties, particularly creep resistance and a process for preparing such modified PTFE.

2. Description of the Related Art

A porous PTFE article is produced by, for example, by drawing an unsintered PTFE film at a temperature lower than the melting point of PTFE to make it porous and then sintering the drawn PTFE film while maintaining the drawn state at a temperature higher than the melting point of PTFE. By such a method, only a porous PTFE film having a thickness of from several microns to 100 microns is produced, but a porous article having a desired shape cannot be prepared.

Then, it is proposed to prepare a porous PTFE article by compression molding unsintered PTFE powder under low pressure followed by sintering at a temperature higher than the melting point of PTFE. However, the density of PTFE powder increases considerably during sintering, so that it is difficult to produce a porous article having a large porosity.

It is also proposed to prepare a porous PTFE article by sintering unsintered PTFE powder at a temperature higher than the melting point of PTFE, grinding the sintered PTFE powder, press molding the ground powder followed by sintering at a temperature higher than the melting point of PTFE (cf. Japanese Patent Kokai Publication No. 66730/1986). By this method, the steps for preparing the sintered PTFE powder are complicated.

Further, it is proposed to produce a porous PTFE article by molding PTFE powder together with an organic material which has no compatibility with PTFE and can be removed in a subsequent step and removing such material from the molded PTFE article to make it porous. In this method, the porous PTFE article may contain the unremoved material. Therefore, not only is the production step, but also the inspection step becomes complicated.

PTFE is known to be a resin having excellent properties such as heat resistance and chemical resistance, but is poor in creep resistance.

PTFE is commercially produced by polymerizing tetrafluoroethylene by suspension polymerization, emulsion polymerization and the like. All the conventionally utilized polymerization techniques use radial polymerization initiators. No method has been proposed to prepare PTFE having stable properties and with good reproducibility, in the absence of a polymerization initiator.

SUMMARY OF THE INVENTION

One object of the present invention is to provide modified PTFE which is suitable for producing a porous article by low pressure compression molding and has good mechanical properties, particularly creep resistance.

Another object of the present invention is to provide a process for producing such modified PTFE.

According to one aspect of the present invention, there is provided modified PTFE unsintered powder of which has sintering-densification indexes $P_{10}$, $P_{25}$ and $P_{50}$ (subscripts indicating values of premolding pressure (kg/cm$^2$)) of not larger than 0.2.

According to another aspect of the present invention, there is provided a process for producing modified PTFE comprising polymerizing tetrafluoroethylene and a diene compound of the formula:

$$CH_2=CH-(CF_2)_n-CH=CH_2 \qquad (I)$$

wherein n is an integer of 0 to 20, preferably 6 to 20 in the absence of a radical polymerization initiator.

DETAILED DESCRIPTION OF THE INVENTION

The present invention has been completed based on such findings that tetrafluoroethylene can be polymerized in the presence of a certain diene compound in the absence of a radical initiator, that the thus prepared modified PTFE has better mechanical properties than conventional PTFE or modified PTFE, and that when powder of such modified PTFE is compression molded under low pressure to produce a porous article, a porosity of the article can be easily changed widely by controlling the premolding pressure.

In the context of this invention, "unsintered" is intended to mean that freshly prepared PTFE has not been subjected to sintering treatment, namely heating to a temperature higher than a crystalline melting point of PTFE, and "powder" is intended to mean PTFE particles have an average particle size of 100 μm or less.

The sintering-densification index is measured and defined as follows:

Unsintered PTFE powder (10 g) is filled in a mold having a diameter of 30 mm and premolded under a pressure of 10, 25 or 50 kg/cm$^2$ in a temperature range from 23° to 25° C. for 2 minutes to form a PTFE block, and the block is sintered. Then, the sintering-densification index is defined from a change in the density of the PTFE block before and after sintering according to the following equation:

$$P_n = [d - d_0]$$

in which $P_n$ means a sintering-densification index of the PTFE block formed by premolding under pressure of n kg/cm$^2$, d (g/cm³) means a density of the PTFE block after sintering, and d₀ (g/cm³) means a density of the PTFE block before sintering.

The sintering of the premolded PTFE block is effected under the same conditions as employed in the measurement of a standard specific gravity (SSG) of PTFE according to ASTM D 1457-83. That is, the PTFE block is heated from 290° C. to 380° C. at a heating rate of 2° C./min., kept at 380° C. for 30 minutes, cooled to 294° C. at a cooling rate of 1° C./min., kept at 294° C. for 24 minutes and removed from a furnace to cool.

When a sintering-densification index was measured on conventional PTFE polymerized by using the radical polymerization initiator, most of the conventional PTFE had a sintering-densification index of larger than 0.25 at each premolding pressure, and none had a sintering-densification index of not larger than 0.2 at all of the premolding pressures of 10, 25 and 50 kg/cm².

In addition, the modified PTFE according to the present invention has characteristics which are different from the conventional PTFE in a melting-crystallizing test by a differential scanning calorimeter (hereinafter referred to as "DSC").

The melting-crystallizing test by the DSC is effected as follows:

As a DSC, the DSC II type (manufactured by Perkin-Elmer) having high sensitivity is used. Unsintered PTFE powder (10 mg) is precisely weighed and charged in an exclusive aluminum pan of the DSC.

The PTFE sample in the aluminum pan is heated from 200° C. to 380° C. at a heating rate of 10° C./min. to measure a crystalline melting state of the PTFE sample. Corresponding to the heat of fusing during melting, an endothermic peak due to melting (the initial or first melting peak) is recorded on a chart. Immediately after reaching 380° C., the sample is cooled to 200° C. at a cooling rate of 10° C./min. to measure a crystallization state of the sample. In this step, corresponding to heat of crystallization, an exothermic peak due to crystallization (the first crystallizing peak) is recorded on the chart. After cooling to 200° C., the sample is again heated to 380° C. at a heating rate of 10° C./min. during which another endothermic peak (the second melting peak) is recorded on the chart to obtain a crystal melting chart after melting and recrystallization.

In the above measurement, the rates of heating and cooling should be precisely adjusted because, as is well known, a peak temperature and a shape of the peak for the melting and crystallization of PTFE are greatly influenced by the heating and cooling rates during measurement (cf. for example, Apply Polymer Simposia, No. 2, 101-109 (1966)).

Although the melting peak temperature and a shape of an endothermic curve in the first melting step differ from one conventional PTFE to another due to the different polymerization methods used in their preparation, and the like, the melting peaks in the second and subsequent melting steps (hereinafter referred to as "second melting peak") appear at a temperature which is inherent to PTFE. In ASTM D 1457-83, the second melting temperature is defined as 327° C. (±10° C.). However, the PTFE to be used in a practical molding of an article does not always have such a wide second melting temperature range. Actually measured and reported second melting temperatures of PTFE are 327° C.

However, the second melting peak of the modified PTFE according to the present invention has an endothermic peak or shoulder at a temperature higher than the second melting peak temperature of the conventional PTFE, for example, at a temperature of 330° C. or higher.

In the modified PTFE adequately polymerized according to the present invention, the endothermic peak at a higher temperature dominates the endothermic peak of the conventional PTFE at a lower temperature. As the result, the endothermic peak appears at a temperature of 330° to 345° C., particularly 332° to 340° C.

Usually, the first crystallizing peak appears at a temperature lower than the second melting peak temperature.

When these peaks are measured for the conventional PTFE, the temperature difference between these two peaks is 12° C. or larger and mostly around 15° C.

In case of the modified PTFE according to the present invention, not only the second melting peak but also the first crystallizing peak shifts to the high temperature ranges, and the first crystallizing peak shift is larger than the second melting peak so that the temperature difference between these two peaks decreases to usually not larger than 10° C., particularly around 8° C.

The modified PTFE according to the present invention may be prepared by copolymerizing tetrafluoroethylene and the diene compound (I) in the absence of a radical polymerization initiator.

The amount of the diene compound (I) is 0.01 to 1% by mole based on the mole of tetrafluoroethylene. The diene compound (I) may be mixed with tetrafluoroethylene in gas states or dissolved in a suitable solvent to form a solution to which tetrafluoroethylene is dissolved under pressure. Then, the gaseous mixture or the solution is subjected to polymerization.

The diene compound (I) may be prepared by adding one molecule of ethylene to each molecular end of a diiodide compound of the formula:

wherein n is the same as defined above in the presence of a radical initiator or by irradiation of light to form a diiodide compound of the formula:

wherein n is the same as defined above and then removing hydrogen with an alkali.

In place of or in addition to the diene compound (I), following diene compounds may be used:

a diene compound of the formula:

wherein V₁ and V₂ are the same or different and CH₂=CH—, CF₂=CF—, CF₂=CH—, CH₂=CF—, CF₂=CF—O—, CH₂=CF—O— or CHF=CF—O— and R is a divalent residue selected from the group consisting of residues of the formulae:

wherein l is an integer of 0 to 5, m is an integer of 0 to and n is an integer of 0 to 5, $-(CH_2)_p-$ wherein p is an integer of 1 to 20, $-CO-$ and $-SO_2-$;

a diene compound of the formula:

wherein a is an integer of 0 to 5, b is an integer of 0 to 20 and c is an integer of 0 to 5;

a diene compound of the formula:

wherein d is an integer of 0 to 5, e is an integer of 1 to 10 and f is an integer of 0 to 5;

a diene compound of the formula:

$$CF_2=CF-O-(OCF_2CF_2CF_2)_g-O-(CF_2)_2-O-(CF_2CF_2CF_2O)_h-CF=CF_2 \quad (VII)$$

wherein g and h are each an integer of 0 to 5;
1,1-difluoropropadiene ($CH_2=C=CF_2$);
and perfluoropropadiene ($CF_2=C=CF_2$).

A polymerization temperature is from $-20°$ to $100°$ C., and a pressure is from 0 to 30 kg/cm²G.

The polymerization can be carried out in a gas or liquid phase.

In case of the liquid phase polymerization, preferred solvents are flon type solvents (e.g. trichlorotrifluoroethane, dichlorotetrafluoroethane, tetrachlorodifluoroethane, etc.), fluorine-containing amines (e.g. perfluorotriethylamine, perfluorotributylamine, etc.) and perfluoroalkanes (e.g. perfluorohexane, etc.) and the like. If necessary, water may be present in the solvent. When the modified PTFE which exhibits the characteristics of the present invention definitely is to be prepared, a solvent containing fluorine in a high content (e.g. dichlorotetrafluoroethane, tri(perfluoroalkyl)amines and perfluoroalkanes, etc.) is advantageously used.

When such modified PTFE is prepared by using a solvent such as trichlorotrifluoroethane, the diene compound is used in a higher amount and the polymerization is carried out at a temperature not higher than 50° C. and under high partial pressure of tetrafluoroethylene.

To proceed the polymerization more stably, tetrafluoroethylene is post-polymerized in the presence of a small amount of the polymer of the present invention as a seed in the absence of a radical polymerization initiator. As the seed polymer, preferably the modified PTFE exhibiting the characteristics of the present invention definitely is used. Further, the seed polymer is not subjected to thermal or chemical treatment which deteriorates the post-polymerization activity of the polymer.

The post-polymerization may be carried out in a gas or liquid phase in the presence or absence of the diene compound. When the modified PTFE which exhibits the characteristics of the present inventions is to be prepared, the diene compound is added to the reaction system. Even when the diene compound is not present in the post-polymerization, the produced polymer has the sintering-densification index of 0.2 or less.

The post-polymerized polymer can be used as a seed polymer for further post-polymerization.

In addition, in case of the liquid phase polymerization, a material to be blended (blend material) in the polymer may be dispersed in the solvent. By such a method, a composite polymeric material containing the blend material with better dispersibility than a composite material prepared by mere blending of the polymer powder and the blend material. As the blend material, exemplified are inorganic fillers for reinforcing the polymer and materials which can impart some function to the polymer such as electrically conductive materials, noble metal catalysts and enzymes.

In the polymerization, an additional modifier may be copolymerized in an amount of 2% by weight or less, preferably 1% by weight or less based on the amount of tetrafluoroethylene.

Specific examples of the additional modifier are hexafluoropropylene, vinyl fluoride, vinylidene fluoride, perfluoroalkyl vinyl ether, trichlorotrifluoroethylene and the like.

In case of the gas phase reaction, a reactor made of steel is preferably used. Also a fluidized bed type reactor can be used to eliminate polymerization heat effectively. In case of the liquid phase reaction, a stainless steel or glass made autoclave or a glass-lined autoclave is preferably used.

The polymerization reaction according to the present invention has different characteristics from the radical polymerization in the presence of the conventional polymerization initiator. That is, when tetrafluoroethylene is radical polymerized in a fluorine-containing solvent containing dissolved 1,1-diphenylpicryl-2-hydrazyl (hereinafter referred to as "DPPH") which is known as a polymerization inhibitor according to the conventional method, DPPH is completely consumed by radicals generated by the added radical polymerization initiator so that a color of the solution changes from purple to pale yellow and, thereafter, the polymerization begins. On the contrary, in the polymerization which uses no polymerization initiator according to the present invention, the polymerization proceeds without consuming DPPH, namely with reserving the purple color of the solution. This means that the polymerization mechanism according to the present invention may differ from that of the radical polymerization.

The modified PTFE produced according to the present invention may have cross linking bonds formed through the diene compound. However, the content of the cross linking sites in the modified PTFE of the present invention may be far less than that in a modified PTFE prepared by copolymerization of tetrafluoroethylene and the diene compound (I) in the presence of a conventional radical polymerization initiator, since in an IR spectrum of the conventional PTFE, absorption at a wave number of 1,020 cm$^{-1}$ which is assigned to the cross linking sites is found, while in the IR spectrum of the modified PTFE of the present invention, such absorption is not found.

A modified PTFE prepared by copolymerization of tetrafluoroethylene and the diene compound (I) in the presence of the conventional radical polymerization initiator has properties which are different from the modified PTFE of the present invention, since the former has an endothermic peak in the DSC chart after melting and recrystallizing at a temperature of 320° to 325° C., while the latter has the endothermic peak at a temperature of 330° to 345° C.

Such a difference may be attributed to the fact the polymerization reactivities of the diene compound (I) and tetrafluoroethylene may vary with the polymerization modes so that the number of the cross linking sites contained in the polymer is different.

When the polymer powder of the present invention recovered from the polymerization mixture or fine powder prepared by grinding such polymer powder is molded under a pressure much lower than that employed in the molding of PTFE to form a void free article and the change of density of the molded article before and after sintering is measured, the change in the density of the modified PTFE according to the present invention is smaller than that of the PTFE prepared by the conventional radical polymerization. Therefore the PTFE powder of the present invention is suitable for producing a porous article.

The powder or fine powder of the modified PTFE of the present invention was compressed and sintered to produce a molded article and subjected to a creep test. As the result, it was found that, in comparison to the molded article of the conventional PTFE prepared by radical polymerization by using the polymerization initiator, the molded article of the modified PTFE of the present invention has much improved creep resistance.

PREFERRED EMBODIMENTS OF THE INVENTION

The present invention will be illustrated by following Examples.

EXAMPLE 1

In a steel made 20 l pressure vessel which had been evacuated, a diene compound (3 g) of the formula:

in a gas state. Then, the vessel was pressurized to 9.3 kg/cm$^2$G by tetrafluoroethylene. After keeping the vessel at room temperature for about 2.5 hours, polymerization was initiated and carried out for about 15 minutes. When the vessel temperature rose to around 90° C. by polymerization heat, the reaction was terminated. After purging the interior gas, a produced polymer (350 g) was recovered.

The sintering-densification indexes $P_{10}$, $P_{25}$ and $P_{50}$ of the produced polymer were 0.04, 0.05 and 0.05, respectively.

Figure 1:
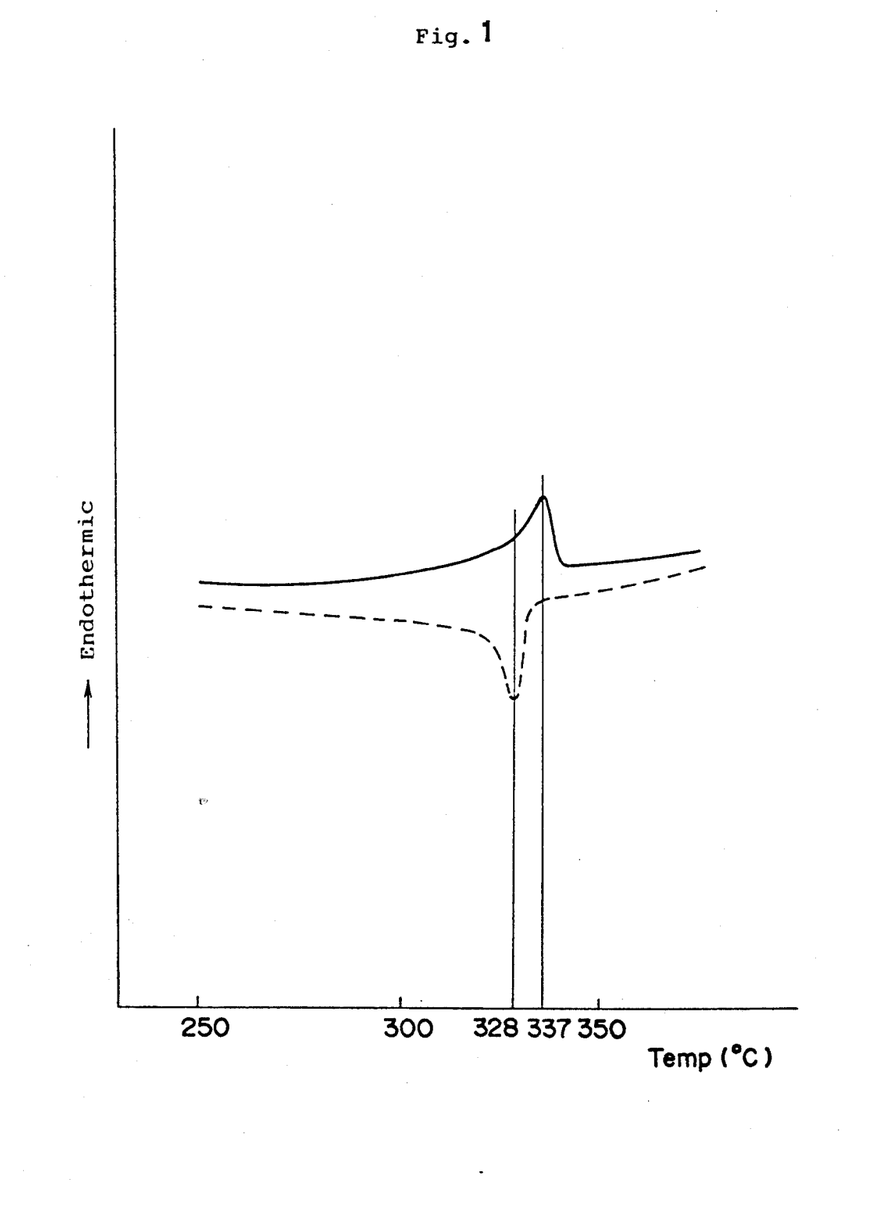
FIGS. 1–8 are the DSC charts of the PTFE polymers prepared in Examples 1, 2, 10, 11, 13, 14 and 15 and Comparative Example, respectively.

By using the DSC (DSC II type manufactured by Perkin-Elmer), the polymer (10 mg) was heated from 200° C. to 380° C. at a heating rate of 10° C./min. and then cooled to 200° C. at a cooling rate of 10° C./min. for recrystallization. Then, the polymer was again heated at a rate of 10° C./min. to measure the melting of the crystallized polymer. The second melting peak temperature (hereinafter referred to as "endothermic peak temperature) was 337° C., and the first crystallizing peak temperature was 328° C. Thus, the difference between these two peak temperatures was 9° C. The DSC chart of this polymer is shown in FIG. 1, in which the solid line and the broken lines represent the melting curve and the crystallizing curve, respectively.

EXAMPLE 2

In a SUS stainless steel made 3 liter autoclave, trichlorotrifluoroethane (1.8 liters) was charged and replaced with nitrogen and tetrafluoroethylene repeatedly. Then, the autoclave was pressurized to 1 kg/cm$^2$G by tetrafluoroethylene. Through a SUS made nozzle equipped to the autoclave, the same diene compound as used in Example 1 (7.5 g) was added. Thereafter, the autoclave was again pressurized to 6 kg/cm$^2$G by tetrafluoroethylene. After 2 hours from the last pressurization, polymerization was initiated and continued for 3 hours at about 40° C. while supplying tetrafluoroethylene with pressure cycle between 5 and 6 kg/cm$^2$G. After polymerization, the product was recovered from the autoclave, filtered and washed with water and dried to obtain a polymer (540 g).

Figure 2:
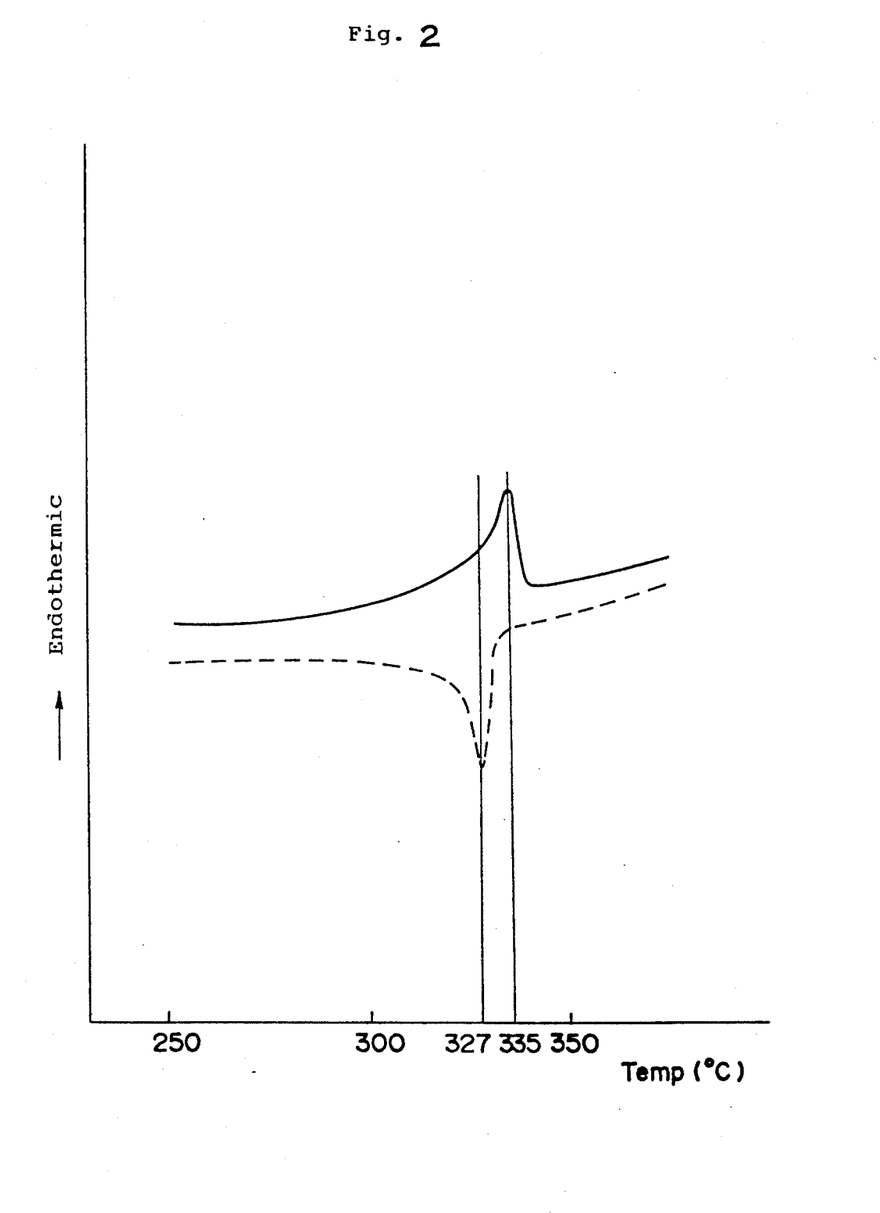

By the same measuring method as in Example 1, the polymer had the endothermic peak temperature of 335° C. The difference from the exothermic peak temperature during crystallization was 8° C. The DSC chart of this polymer is shown in FIG. 2.

EXAMPLE 3

In a SUS stainless steel made 0.4 liter autoclave, trichlorotrifluoroethane (0.1 liter) and pure water (0.1 liter) were charged followed by the addition of the same diene compound as used in Example 2 (4.5 g). Then, the autoclave was pressurized by tetrafluoroethylene and kept at 22.6° C. under 4.8 kg/cm$^2$G. After one hour from the pressurization, polymerization was initiated and continued for 2 hours. After polymerization, a produced polymer (100 g) was recovered.

The sintering-densification indexes $P_{10}$, $P_{25}$ and $P_{50}$ of the produced polymer were 0.09, 0.08 and 0.09, respectively.

The polymer had the endothermic peak temperature of 335° C. The difference from the exothermic peak temperature during crystallization was 7° C.

EXAMPLE 4

In a 1 liter autoclave made of glass, trichlorotrifluoroethane (0.5 liter) and then the same diene compound as used in Example 2 were charged. The autoclave was pressurized to 6 kg/cm$^2$G by tetrafluoroethylene at 40° C. while stirring. After 3 hours from the pressurization, polymerization was initiated and continued for 2.5 hours. After polymerization, a produced polymer (140 g) was recovered.

The sintering-densification indexes $P_{10}$, $P_{25}$ and $P_{50}$ of the produced polymer were 0.07, 0.07 and 0.09, respectively.

The polymer had the endothermic peak temperature of 335° C. The difference from the exothermic peak temperature during crystallization was 7° C.

EXAMPLE 5

In trichlorotrifluoroethane (0.5 liter) contained in the same autoclave as used in Example 4, $\gamma$-Al$_2$O$_3$ powder (5 g) was dispersed, and then the polymerization was carried out in the same manner as in Example 4 to obtain a polymer (145 g), which contained γ-Al$_2$O$_3$ well dispersed therein.

The sintering-densification indexes $P_{10}$, $P_{25}$ and $P_{50}$ of the produced polymer were 0.03, 0.03 and 0.02, respectively.

The polymer had the endothermic peak temperature of 335° C. The difference from the exothermic peak temperature during crystallization was 8° C.

EXAMPLE 6

In the same manner as in Example 4 but using perfluoro(n-tributylamine) in place of trichlorotrifluoroethane, the polymerization was carried out at 30° C. for 4 hours to obtain a polymer (120 g).

The sintering-densification indexes $P_{10}$, $P_{25}$ and $P_{50}$ of the produced polymer were 0.04, 0.06 and 0.05, respectively.

The polymer had the endothermic peak temperature of 338° C. The difference from the exothermic peak temperature during crystallization was 8° C.

EXAMPLE 7

In a 1 liter autoclave made of glass, trichlorotrifluoroethane (600 ml) was charged. After evacuation, the autoclave was pressurized to 1 kg/cm$^2$G by tetrafluoroethylene, and then a diene compound (1 g) of the formula:

$$CH_2=CH-(CF_2)_8-CH=CH_2$$

was added. While stirring at room temperature, the autoclave was again pressurized to 8 kg/cm$^2$G by tetrafluoroethylene. After two hours from the pressurization, polymerization was initiated and continued for 1 hour. After polymerization, a produced polymer (50 g) was recovered.

The sintering-densification indexes $P_{10}$, $P_{25}$ and $P_{50}$ of the produced polymer were 0.08, 0.07 and 0.07, respectively.

The polymer had the endothermic peak temperature of 337° C. The difference from the exothermic peak temperature during crystallization was 8° C.

EXAMPLE 8

In the same autoclave as used in Example 4, the same diene compound as used in Example 4 (0.3 g) was charged. After purging with nitrogen and evacuation, the autoclave was pressurized to 8 kg/cm$^2$G. After keeping the mixture at room temperature for 2 hours, polymerization was initiated and continued for 15 minutes to obtain a polymer (10 g).

The sintering-densification indexes $P_{10}$, $P_{25}$ and $P_{50}$ of the produced polymer were 0.05, 0.05 and 0.06, respectively.

The polymer had the endothermic peak temperature of 340° C. The difference from the exothermic peak temperature during crystallization was 8° C.

EXAMPLE 9

In the same manner as in Example 8 but charging the polymer (ca. 1 g) in the autoclave, the polymerization was carried out. After about 20 minutes from pressurization, post-polymerization was initiated mainly from the precharged polymer and continued for 40 minutes to obtain a polymer (20 g). The polymer had the endothermic peak temperature of 339° C.

The sintering-densification indexes $P_{10}$, $P_{25}$ and $P_{50}$ of the produced polymer were 0.05, 0.04 and 0.05, respectively.

The difference from the exothermic peak temperature during crystallization was 9° C.

EXAMPLE 10

In the same autoclave as used in Example 4, trichlorotrifluoroethane (0.6 liter), the same diene compound as used in Example 4 (0.3 g) and the polymer obtained in Example 8 (0.3 g) was charged. After replacing the interior with nitrogen and tetrafluoroethylene repeatedly, the autoclave was pressurized to 3.8 kg/cm$^2$G while stirring at 30° C. Immediately after pressurization, polymerization was initiated and continued at 30° C. for 3 hours while supplying tetrafluoroethylene with pressure cycle between 5 and 6 kg/cm$^2$G to obtain a polymer (100 g).

The sintering-densification indexes $P_{10}$, $P_{25}$ and $P_{50}$ of the polymer were 0.07, 0.09 and 0.09, respectively.

Figure 3:
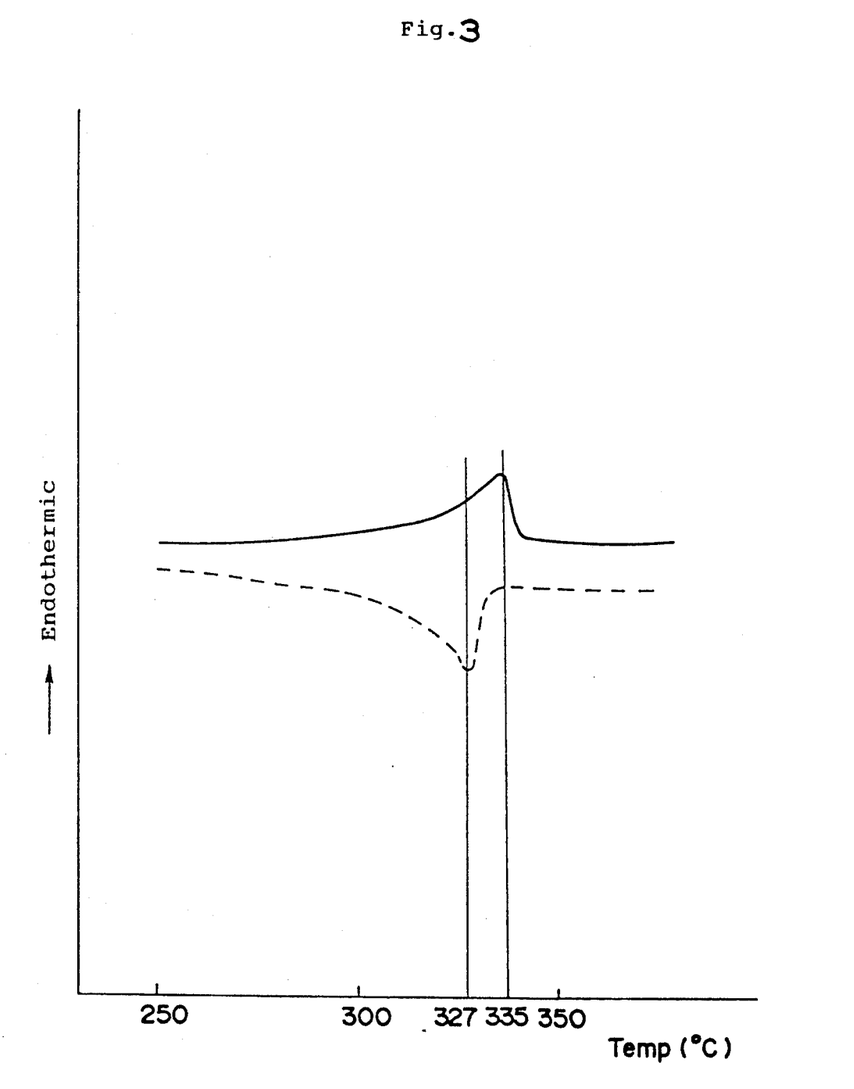

The DSC chart of the polymer is shown in FIG. 3. The polymer had the endothermic peak temperature of 335° C. The difference from the exothermic peak temperature during crystallization was 8° C.

EXAMPLE 11

In the same manner as in Example 10 but using perfluorohexane in place of trichlorotrifluoroethane, the polymerization was carried out at 30° C. for 3 hours to obtain a polymer (110 g).

The sintering-densification indexes $P_{10}$, $P_{25}$ and $P_{50}$ of the polymer were 0.04, 0.06 and 0.06, respectively.

Figure 4:
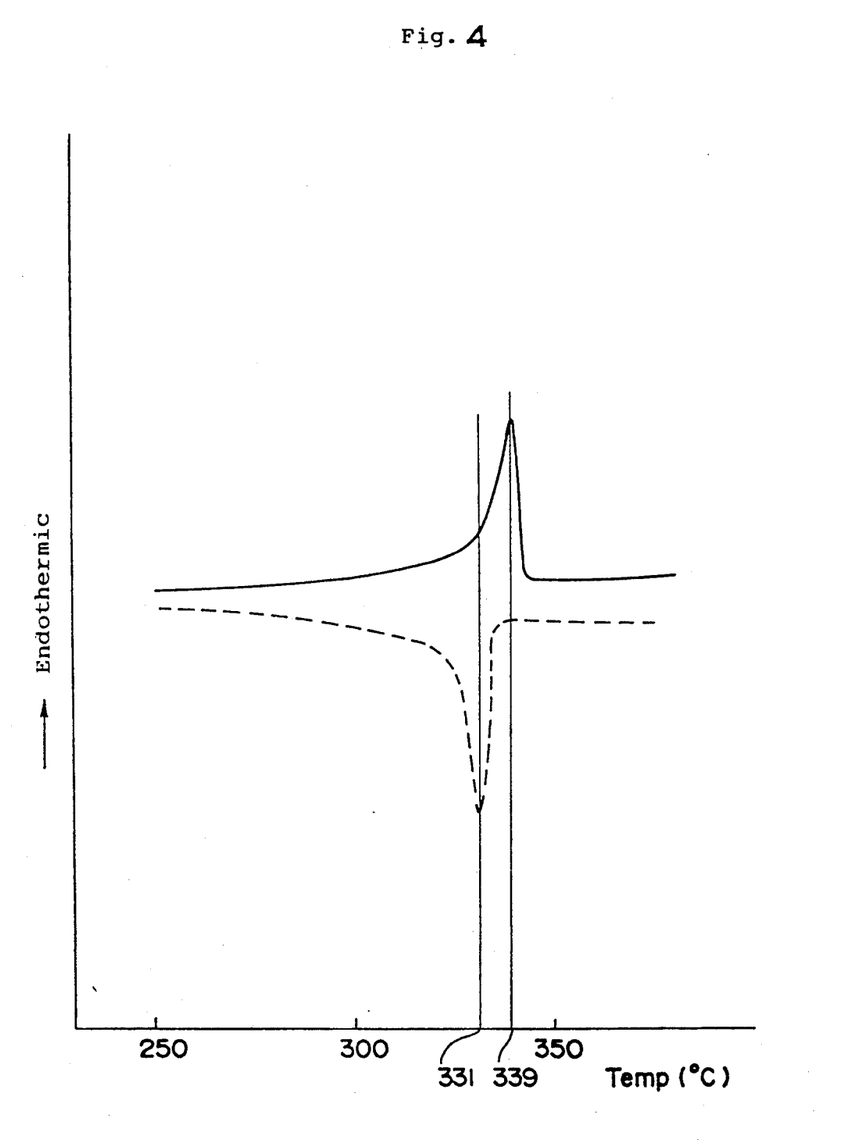
Figure 5:
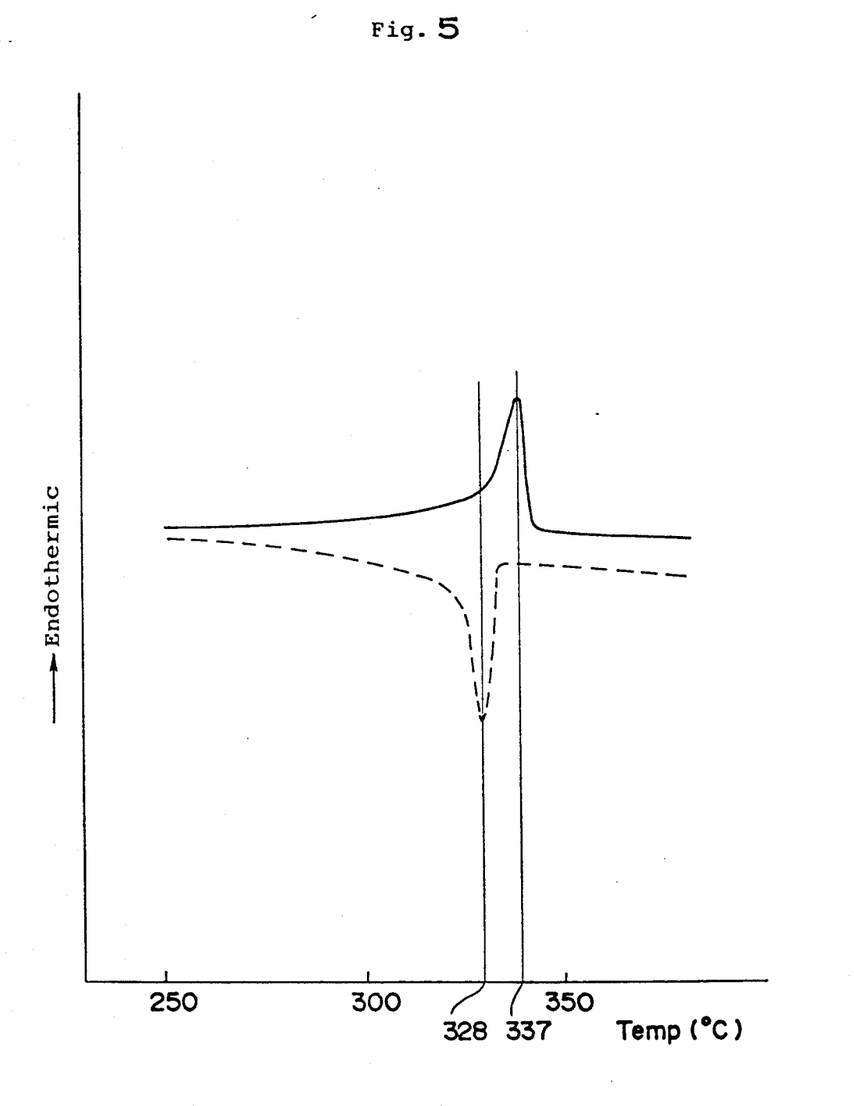

The polymer had the endothermic peak temperature of 339° C. The difference from the exothermic peak temperature during crystallization was 8° C. The polymer showed sharp peak shapes as shown in FIG. 4 and had the characteristics of the present invention clearly.

EXAMPLE 12

In the same manner as in Example 11 but using the polymer obtained in Example 11 (0.3 g) in place of the polymer obtained in Example 8, polymerization was carried out. It took about two hours till the initiation of polymerization. After 5 hour polymerization, a polymer (220 g) was obtained.

The polymer had the endothermic peak temperature of 337° C. The difference from the exothermic peak temperature during crystallization was 8° C.

EXAMPLE 13

In the same manner as in Example 11 but using dichlorotetrafluoroethane in place of trichlorotrifluoroethane and pressuring the autoclave to 4.9 kg/cm$^2$G by tetrafluoroethylene, polymerization was carried out. Immediately after pressurization, polymerization was initiated and continued for 4.5 hours to obtain a polymer (118 g).

Figure 10:
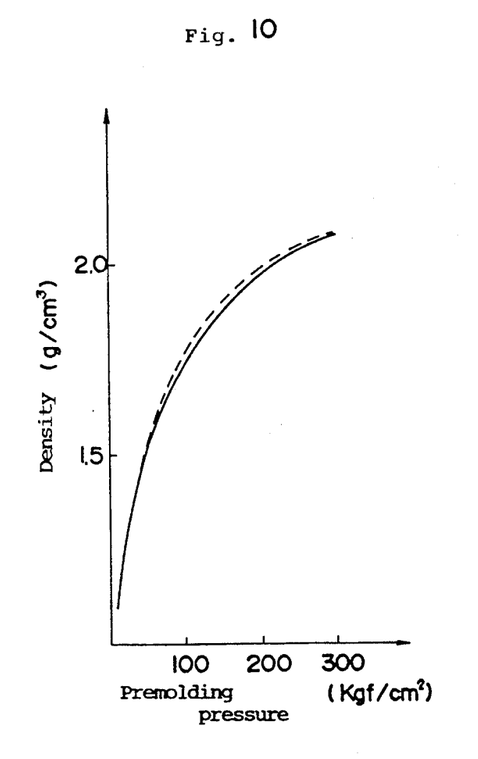

As calculated from FIG. 10, the sintering-densification indexes $P_{10}$, $P_{25}$ and $P_{50}$ of the polymer were 0.03, 0.02 and 0.02, respectively.

Figure 7:
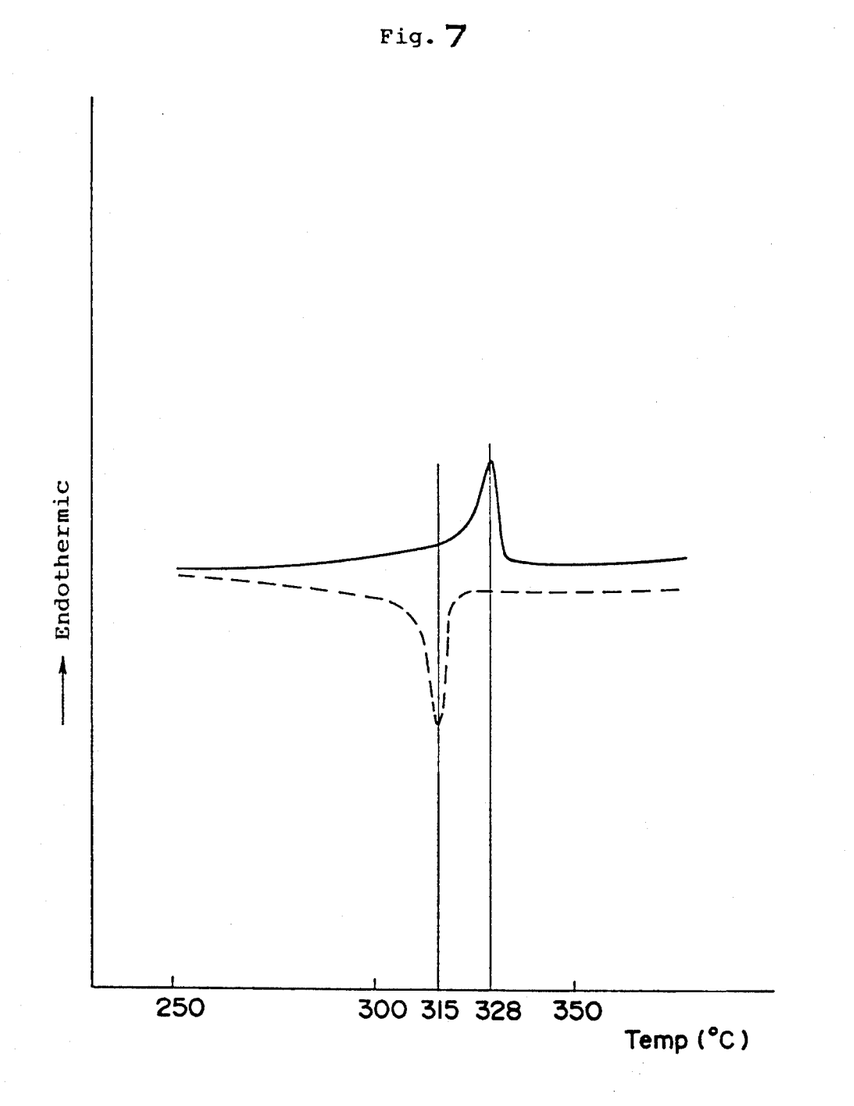

The DSC chart of the polymer is shown in FIG. 7.

The polymer had the endothermic peak temperature of 327° C. The difference from the exothermic peak temperature during crystallization was 9° C. The endothermic peak had a shoulder at a temperature of 331° C. and higher.

As the polymer of Example 11, the polymer prepared in this Example had the characteristics of the modified PTFE of the present invention clearly.

EXAMPLE 14

In the same manner as in Example 11 but using dichlorotetrafluoroethane in place of trichlorotrifluoroethane and pressurizing the autoclave to 5.6 kg/cm$^2$G, the polymerization was carried out. Immediately after pressurization, the polymerization was initiated. After 4 hours of polymerization, a polymer (105 g) was obtained.

The sintering-densification indexes $P_{10}$, $P_{25}$ and $P_{50}$ of the polymer were 0.01, 0.02 and 0.03, respectively.

The polymer obtained in this Example exhibited the characteristics of the present invention less clearly.

Figure 6:
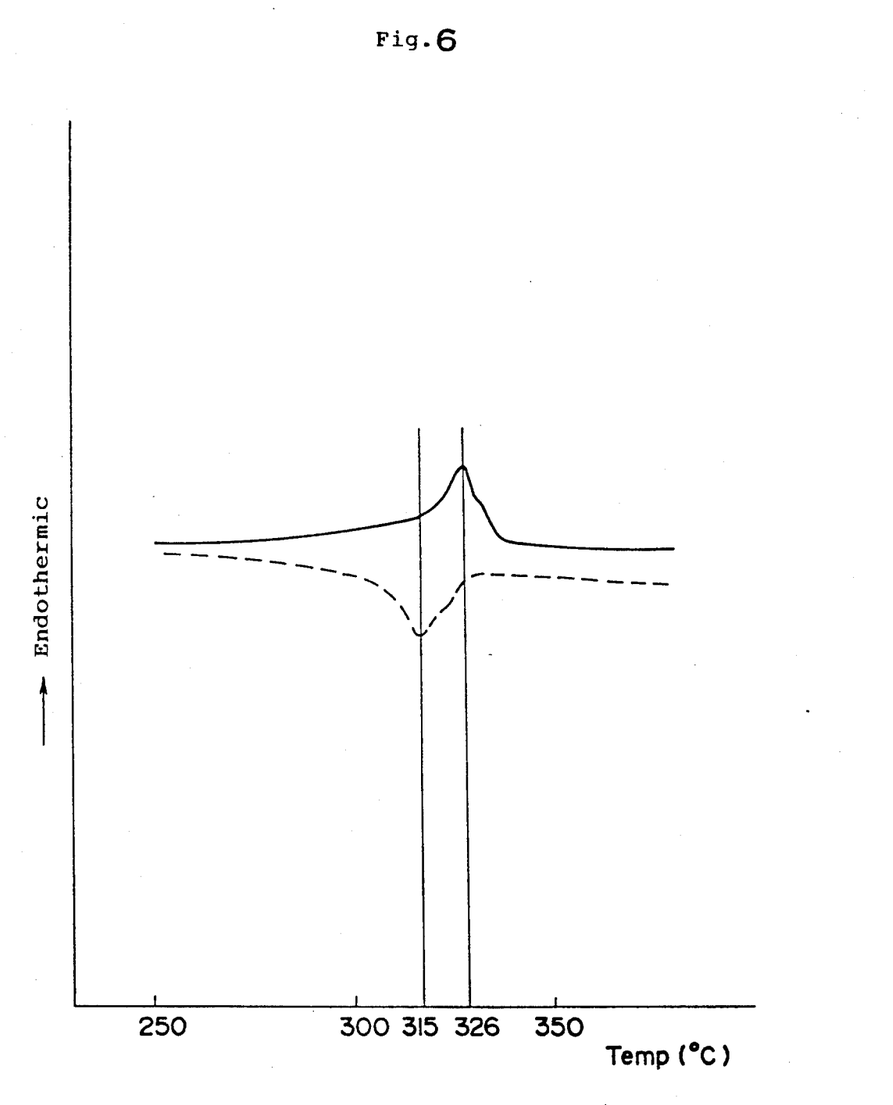

The DSC chart of the polymer is shown in FIG. 6.

The polymer had the endothermic peak temperature of 326° C. The difference from the exothermic peak temperature during crystallization was 11° C. The endothermic peak had a shoulder at a temperature of 331° C. and higher.

EXAMPLE 15

In the same manner as in Example 11 but using no diene compound, the polymerization was carried out.

Immediately after pressurization, the polymerization was initiated. After one hour and 40 minutes, a polymer (165 g) was obtained.

The polymer had the endothermic peak temperature of 328° C. The difference from the exothermic peak temperature during crystallization was 13° C. The endothermic peak had no shoulder.

The DSC chart of the polymer is shown in FIG. 7.

The sintering-densification indexes $P_{10}$, $P_{25}$ and $P_{50}$ of the polymer were 0.01, 0.04 and 0.05, respectively.

Therefore, the polymer obtained in this Example still had the characteristics of the modified PTFE of the present invention.

COMPARATIVE EXAMPLE

In the same autoclave as used in Example 11, trichlorotrifluoroethane (0.6 liter) and polytetrafluoroethylene which had been irradiated to reduce its molecular weight (2.5 g) were charged. After evacuation, the autoclave was pressurized to 3.8 kg/cm$^2$G while stirring at 30° C. Immediately after pressurization, polymerization was initiated and continued for 4 hours at 30° C. while supplying tetrafluoroethylene to obtain a polymer (190 g).

The sintering-densification indexes $P_{10}$, $P_{25}$ and $P_{50}$ of the polymer were 0.26, 0.27 and 0.25, respectively.

Figure 8:
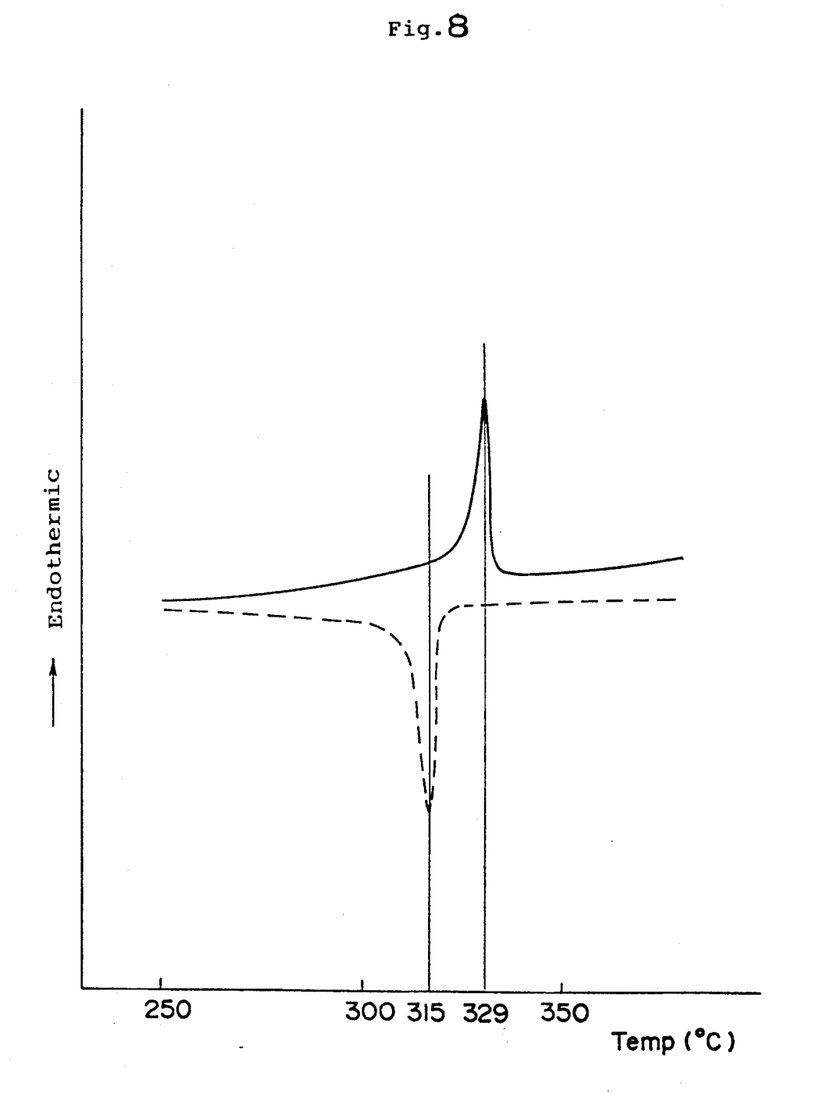

The DSC chart of the polymer is shown in FIG. 8. The polymer had the endothermic peak temperature of 329° C. The difference from the exothermic peak temperature during crystallization was 14° C.

This polymer had no characteristics of the modified PTFE according to the present invention.

EXPERIMENT 1

Figure 9:
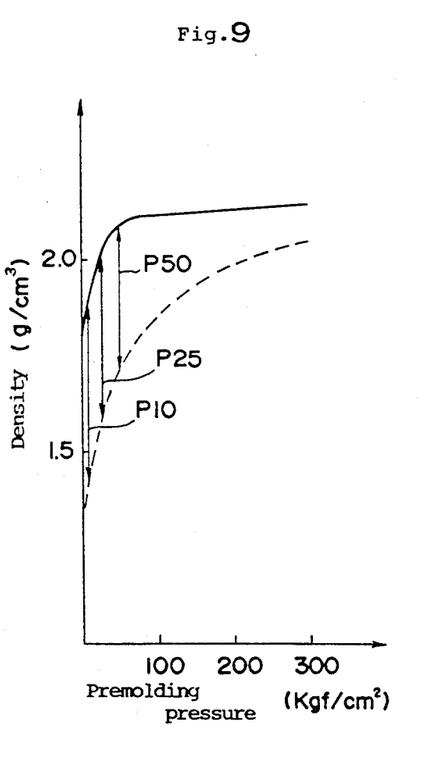
FIGS. 9 and 10 are graphs showing the relationship between the premolding pressure and the density in Experiment 1.

In a mold having a diameter of 30 mm, the polymer powder obtained in Example 13 or commercially available polytetrafluoroethylene (Polyflon (trade mark) M-12 manufactured by Daikin Industries Ltd.) (each 10 g) was charged and precompressed under pressure of 10, 25, 50 or 300 kg/cm$^2$G for 2 minutes. The precompressed polymer was removed from the mold, placed in an electric furnace and sintered at 380° C. for 30 minutes. The relationship between the compression pressure and a density before and after sintering is shown in FIGS. 9 and 10.

In Polyflon M-12, pores of the polymer were broken during sintering even when the polymer was precompressed under low pressure so that the molded article shrunk after sintering so that the increase of density was large. For example, the sintering-densification indexes $P_{10}$, $P_{25}$ and $P_{50}$ of Polyflon M-12 calculated from FIG. 9 were 0.43, 0.44 and 0.37, respectively.

On the contrary, the density of the modified PTFE according to the present invention less changed after sintering. The sintering-densification indexes $P_{10}$, $P_{25}$ and $P_{50}$ of this polymer were 0.03, 0.02 and 0.02, respectively as described in Example 13. These values indicate that this polymer is suitable for producing a porous article of PTFE.

The DSC chart of the polymer is shown in FIG. 3. The polymer had the endothermic peak temperature of 335° C. The difference from the exothermic peak temperature during crystallization was 8° C.

EXPERIMENT 2

In a mold having a diameter of 45 mm, the polymer powder obtained in Example 2 or commercially available polytetrafluoroethylene molding powder (Polyflon (trade mark) M-12 manufactured by Daikin Industries Ltd.) (each 85 g) was charged and precompressed under pressure of 300 kg/cm$^2$G for 10 minutes. The precompressed polymer contained in the mold was placed in an electric furnace and sintered at 380° C. for 2.5 hours. Immediately after removing from the furnace, the polymer was air cooled under pressure of 500 kg/cm$^2$G for 40 minutes and water cooled to obtain a cylindrical molded article having a diameter of 45 mm and a length of 25 mm.

From this article, a sample of 11.3 mm in diameter and 10 mm in length was cut out in parallel with the compression direction and compressed at room temperature (24° C.) or 200° C. according to ASTM D-621. The permanent deformation results are shown in Table.

TABLE

| | Measuring conditions | PTFE of Example 2 | Polyflon M-12 |
|---|---|---|---|
| Compression creep | 2,000 psi, 24° C., 24 hrs | 3.8% | 5.9% |
| | 1,000 psi, 200° C., 24 hrs | 3.5% | 5.8% |
| Full deformation | 2,000 psi, 24° C., 24 hrs | 10.6% | 13.3% |
| | 1,000 psi, 200° C., 24 hrs | 18.9% | 24.8% |
| Permanent deformation | 2,000 psi, 24° C., 24 hrs | 2.8% | 4.3% |
| | 1,000 psi, 200° C., 24 hrs | 4.6% | 11.6% |

What is claimed is:

1. A modified polytetrafluoroethylene produced by a process which comprises polymerizing tetrafluoroethylene in the presence of a diene compound of the formula:

$$CH_2=CH-(CF_2)_n-CH=CH_2 \qquad (I)$$

wherein n is an integer of 6 to 20 and in the absence of a radical polymerization initiator,
    wherein unsintered powder of said modified polytetrafluoroethylene has sintering-densification indexes $P_{10}$, $P_{25}$ and $P_{50}$ of not larger than 0.2.

2. The modified polytetrafluoroethylene according to claim 1, which has an endothermic peak or shoulder in a temperature range of 330° C. or higher in a differential scanning calorimetric chart after melting and recrystallizing.

3. The modified polytetrafluoroethylene according to claim 1, which has an endothermic peak at a temperature of 330° C. to 345° C. and difference between said endothermic peak temperature in a differential scanning calorimetric chart after melting and recrystallizing and an exothermic peak temperature in the same measurement is not larger than 10° C.

4. The modified polytetrafluoroethylene according to claim 1, which has an endothermic peak at a temperature of 332° C. to 340° C. and difference between said endothermic peak temperature in a differential scanning calorimetric chart after melting and recrystallizing and an exothermic peak temperature in the same measurement is not larger than 10° C.

5. The modified polytetrafluoroethylene according to claim 1, wherein the diene compound is present in an amount of about 0.01 to 1% by mole based on the mole of tetrafluoroethylene.

6. A modified copolymer produced by a process which comprises polymerizing tetrafluoroethylene with hexafluoropropylene, vinyl fluoride, vinylidene fluoride, perfluoroalkyl vinyl ether or trichlorotrifluoroethylene, in the presence of a diene compound of the formula:

$$CH_2=CH-(CF_2)_n-CH=CH_2 \qquad (I)$$

wherein n is an integer of 6 to 20 and in the absence of a radical polymerization initiator, wherein unsintered powder of said modified copolymer produced has sintering-densification indexes $P_{10}$, $P_{25}$ and $P_{50}$ of not larger than 0.2.

7. A modified polytetrafluoroethylene blend produced by a process which comprises polymerizing tetrafluoroethylene in the presence of a modified polytetrafluoroethylene according to claim 1 and in the absence of a radical polymerization initiator, wherein unsintered powder of said modified polytetrafluoroethylene blend produced has sintering-densification indexes $P_{10}$, $P_{25}$ and $P_{50}$ of not larger than 0.2.

* * * * *